United States Patent [19]

Kunz et al.

[11] Patent Number: 5,269,588
[45] Date of Patent: Dec. 14, 1993

[54] VEHICLE SEAT HAVING A PIVOTABLE BACKREST AND A SEAT PART HEIGHT ADJUSTMENT INDEPENDENT OF BACKREST INCLINATION

[75] Inventors: Holger Kunz, Kaiserslautern; Hans W. Voss, Rockenhausen; Heinz P. Cremer, Kaiserslautern, all of Fed. Rep. of Germany

[73] Assignee: Keiper Recaro GmbH & Co., Remscheid, Fed. Rep. of Germany

[21] Appl. No.: 651,560

[22] Filed: Feb. 6, 1991

[30] Foreign Application Priority Data

Feb. 8, 1990 [DE] Fed. Rep. of Germany ....... 4003776

[51] Int. Cl.⁵ .............................................. B60N 2/16
[52] U.S. Cl. ................... 297/322; 297/378.1; 297/341
[58] Field of Search ............... 297/379, 378, 341, 316, 297/322

[56] References Cited

U.S. PATENT DOCUMENTS

| | | | |
|---|---|---|---|
| 4,368,916 | 1/1983 | Blasin | 297/341 |
| 4,382,629 | 5/1983 | Froumajou | 297/322 |
| 4,452,486 | 6/1984 | Zapf et al. | 297/341 X |
| 4,671,571 | 6/1987 | Gionet | 297/341 |
| 4,765,679 | 8/1988 | Lanuzzi et al. | 297/316 |
| 4,957,321 | 9/1990 | Martin et al. | 297/379 X |
| 4,973,104 | 11/1990 | Nakayama et al. | 297/341 |

FOREIGN PATENT DOCUMENTS

| | | |
|---|---|---|
| 2813534 | 3/1978 | Fed. Rep. of Germany . |
| 2947813 | 11/1979 | Fed. Rep. of Germany . |
| 3226198 | 7/1982 | Fed. Rep. of Germany . |
| 1267875 | 3/1972 | United Kingdom . |
| 1432889 | 4/1976 | United Kingdom . |
| 1446992 | 8/1976 | United Kingdom . |
| 1460070 | 12/1976 | United Kingdom . |
| 1498818 | 1/1978 | United Kingdom . |
| 1540357 | 2/1979 | United Kingdom . |
| 1552335 | 9/1979 | United Kingdom . |
| 2102674 | 2/1983 | United Kingdom . |
| 2155780 | 10/1985 | United Kingdom . |
| 2171899 | 9/1986 | United Kingdom . |
| 2216403 | 11/1989 | United Kingdom . |

*Primary Examiner*—Kenneth J. Dorner
*Assistant Examiner*—Milton Nelson, Jr.
*Attorney, Agent, or Firm*—Wigman, Cohen, Leitner & Myers

[57] ABSTRACT

A vehicle seat, especially a motor vehicle seat, includes an adjustable device which permits adjustment of the seat part, relative to the freely pivotable backrest. The cushion support of the seat part, at least in one position of the cushion support above its lowermost position, can be moved before or at the beginning of a free pivoting motion of the part of the backrest forwards and/or downwards at least in the region of its rear section, and can be moved back into its starting position after or while the backrest pivots back into its starting position.

12 Claims, 7 Drawing Sheets

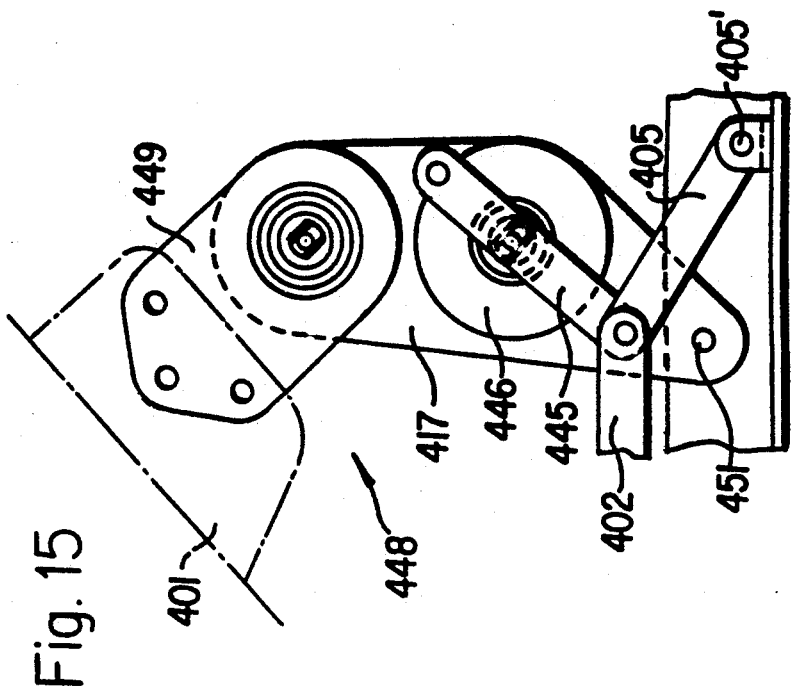
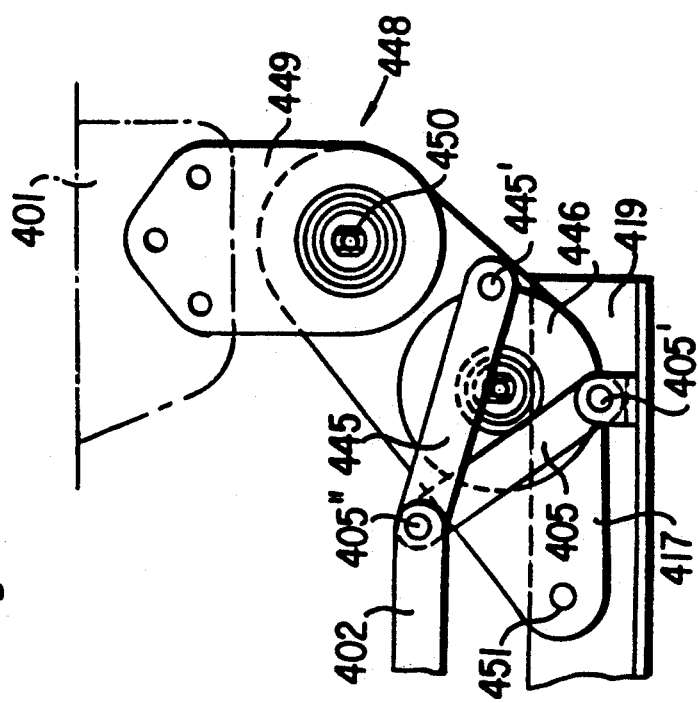

VEHICLE SEAT HAVING A PIVOTABLE BACKREST AND A SEAT PART HEIGHT ADJUSTMENT INDEPENDENT OF BACKREST INCLINATION

BACKGROUND OF THE INVENTION

1. Field of the Invention

The invention relates to a vehicle seat, especially a motor vehicle seat with a cushion support of the seat part, such that, the cushion support can be adjusted relative to the freely pivotable backrest by means of an adjustment device. As used herein, a freely pivotable backrest is understood to mean a backrest which can be tipped forward without having to activate the adjustment drive for adjusting the slant position.

2. Description of the Prior Art

With the aforementioned vehicle seats, a relatively strong cushion pressure between the cushion of the backrest and the seat cushion is tolerated, at least when the latter is set into its topmost position by means of the height-and/or slant-adjustment device in the region of its rearward end. This situation is tolerated, despite its associated disadvantages, to prevent a considerable gap from existing between the rearward end of the seat cushion and the lower end of the backrest cushion when the seat cushion is in its lowermost position.

OBJECTS AND SUMMARY OF THE INVENTION

It is an object of the present invention to provide a vehicle seat of the aforementioned type wherein the backrest can be freely pivoted regardless of the height adjustment of the rearward end of the cushion support of the seat part, without a troublesome cushion pressure occurring thereby.

It is a further object of the present invention to provide a vehicle seat having a cushion support which is adjustable relative to the freely pivotable backrest by means of an adjustment device.

It is a still further object of the present invention to provide a cushion support wherein a portion thereof can be moved, by means of the adjustment device, before or at the beginning of a free pivoting motion of the backrest, from its starting position towards the front and/or downwards at least in the region of its rear end section, and can be moved back into its starting position after or while the backrest pivots back into its starting position.

The automatic adjustment of the rearward end section of the cushion support of the seat part before or at the beginning of a free pivoting motion of the backrest moves the seat cushion away forward and/or downward from the lower end of the backrest, even if the cushion support of the seat has been set to its highest position. Furthermore, it moves the cushion away from the backrest far enough so that no cushion pressure occurs or at most only a cushion pressure that is no longer troublesome. This motion of the cushion support of the seat part is preferably initiated and effected by the pivoting motion of the backrest. For example, it can be performed with an adjustment device which includes a rocker on each side, the rocker being mounted in the region of its lower end so as to be pivotable about an axle which runs in the transverse direction of the seat. The rocker is hinged at the cushion support in the area of its upper end, and forms a lever drive by means of a separate connecting lever as well as a crank drive, which is rotatably mounted on a mounting which connects the backrest to the seat frame.

Alternatively, the adjustment device may have two rockers on each side. Each of the rockers are mounted in the area of their lower end so as to be pivotable about an axle which extends in the transverse direction of the seat and is hinged to the cushion support in the area of its upper end. By being connected by means of a coupler the rockers form a four-jointed lever gear. Such adjustment devices are especially advantageous inasmuch as they can also be used to adjust the height and/or slant of the cushion support of the seat part. Thus, two different devices are not necessary.

With the last mentioned adjustment device, it is advantageous to hinge an adjusting element with changeable length to one rocker, preferably the rear rocker of each four-joint lever drive. Thus, the adjustment element on the one hand is pivotably connected to the structure which supports the rockers. Suitable adjustment elements are a threaded spindle that can be driven by a motor, or a working cylinder.

To adjust the cushion support of the seat part, a four-bar lever drive can be Used. Preferably, the length of the adjustment element and/or the position of its foot point and/or the position of the foot point of the rearward rocker is changed along the longitudinal direction of the vehicle. The length of the tension coupler, which defines the distance between the upper ends of the two rockers from one another, can also be changed.

Preferably, a control and/or gear connection is provided between the backrest and that part of the adjustment device which must be moved for the backrest to pivot freely. In this way, the adjustment motion of the seat part is controlled automatically by the motion of the backrest when it pivots freely. This gear connection can be implemented in an especially simple fashion, due to the fact that the lever drive is connected to the lower part of the joint mounting, which is hinged at the seat structure, and which connects the backrest to the seat structure.

The lower end of the adjustment element can be moved to a certain extent along the longitudinal direction of the seat, in order to move the cushion support of the seat part, having consideration for the free pivoting of the backrest. To this extent it is advantageous to provide a slider which is movably mounted in a structure that supports the seat part and the backrest, with an axle that extends in the transverse direction of the seat. The slider can be moved by means of a pulley at least in one direction of motion, where the pulley in necessarily activated when the backrest executes its free pivoting motion.

The adjustment motion of the slider can be effected in simple fashion by means of a pulley from its forward position, corresponding to the lowered position of the cushion support, into its rearward position, corresponding to the starting position, counter to the force of a pretensioned spring. Here, in one direction of motion, the pulley can be replaced by a pre-tensioned spring. Such a slider normally must be locked. Consequently, it is preferred to employ a locking device wherein the slider can be locked positively in its rear position, and loosened automatically by the backrest freely pivoting forwards.

By means of a second pulley and a slide, the locking device can be loosened in simple fashion when the backrest pivots freely. The second pulley grips the slide by means of which the locking device can be loosened counter to the force of a reset spring. The second pulley also grips a lever which is mounted at the supporting structure so as to be pivotable about an axle which runs in a transverse direction of the seat, and is pivotable by means of a projection or driver associated with the backrest.

For an embodiment that is especially advantageous because of its simplicity, a double-armed pivoting lever is provided to activate the pulleys.

BRIEF DESCRIPTION OF THE DRAWINGS

FIG. 6 is an elevational view in section, taken along line VI—VI of FIG. 2, on the tunnel side;

FIG. 7 is an elevational view in section, taken along line VII—VII of FIG. 2, on the tunnel side;

FIG. 14 is a side view illustration corresponding to FIG. 12 showing the seat part in a high position; and FIG. 15 is a side view illustration corresponding to FIG. 13, showing the position of the seat part before the backrest has swung freely according to FIG. 14.

DETAILED DESCRIPTION OF THE PREFERRED EMBODIMENTS

Figure 1:
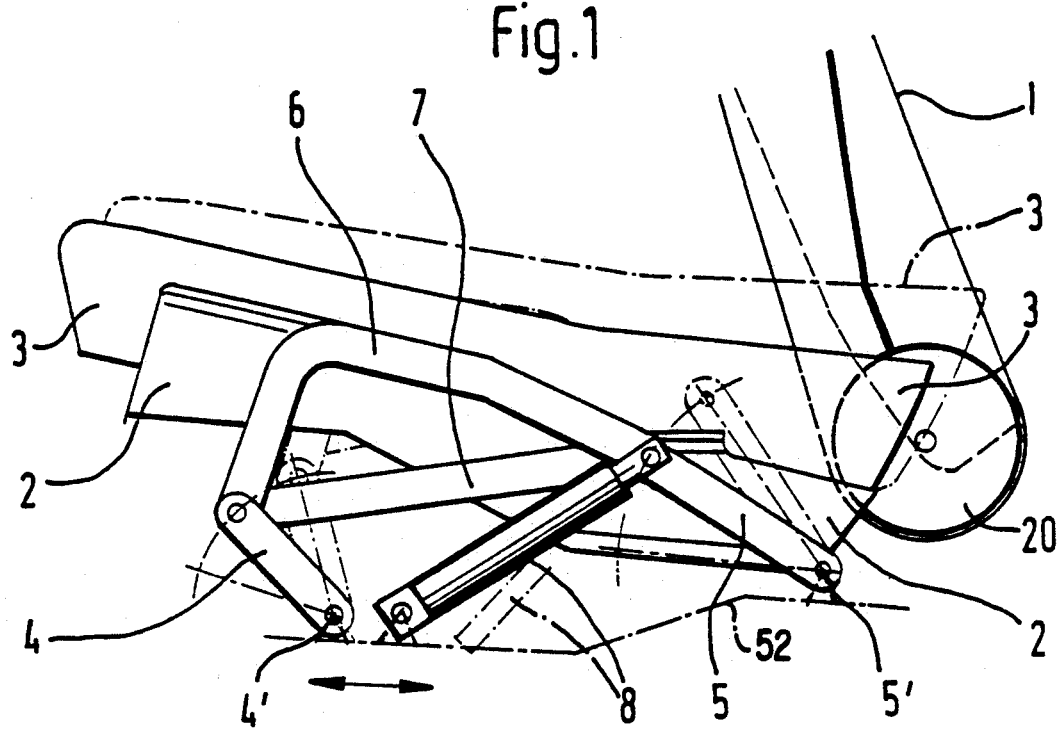
FIG. 1 is a schematic representation, in part, of a side view of a first embodiment of the present invention.

Referring now to the drawings wherein like numerals indicate like parts throughout the several views, FIG. 1 illustrates a motor vehicle seat with a freely pivotable backrest 1, that is, a backrest that can tip forward without activating the backrest adjustment mechanism the seat has a cushion support 2 for the seat cushion 3, the cushion support 2 being supported on each, side by a separate adjustment device in the form of a four-joint lever gear 4 4; 5, 5'6, 7. Each of these two similarly constructed gears has a forward rocker 4 and a rearward rocker 5. Both of these, in the area of the lower end, are connected to the seat frame 52 so that they can pivot about an axle 4', 5', respectively, which are parallel to each other and extend in a transverse direction of the seat. The seat frame 52 can be adjusted in the longitudinal direction of the seat, in customary fashion, by means of rails, of which only the slide rail 19 is shown. In the area of its upper end, a curved bar 6 as well as a tension coupler 7 are connected to the rockers 4 and 5. The curved bar 6 is rigidly connected to the cushion support 2. The tension coupler 7 improves the transmission of force from the cushion support 2 to the rockers 4 and 5, especially in case of a crash. In this first embodiment, the height excursion that can be achieved in the rearward area of the cushion support 2 through the pivoting motion of the rear rocker 5 amounts to about 80 mm.

An adjustment element 8, whose length can be changed, is provided as a pivoting drive for the rockers 4 and 5 also for arresting the cushion support 2 in its instantaneous position or height setting. In the area of its upper end, this adjustment element 8 is hinged to the rear rocker 5. The tension coupler 7 and the curved bar 6 are also pivotably connected to the rear rocker 5.

Figure 2:
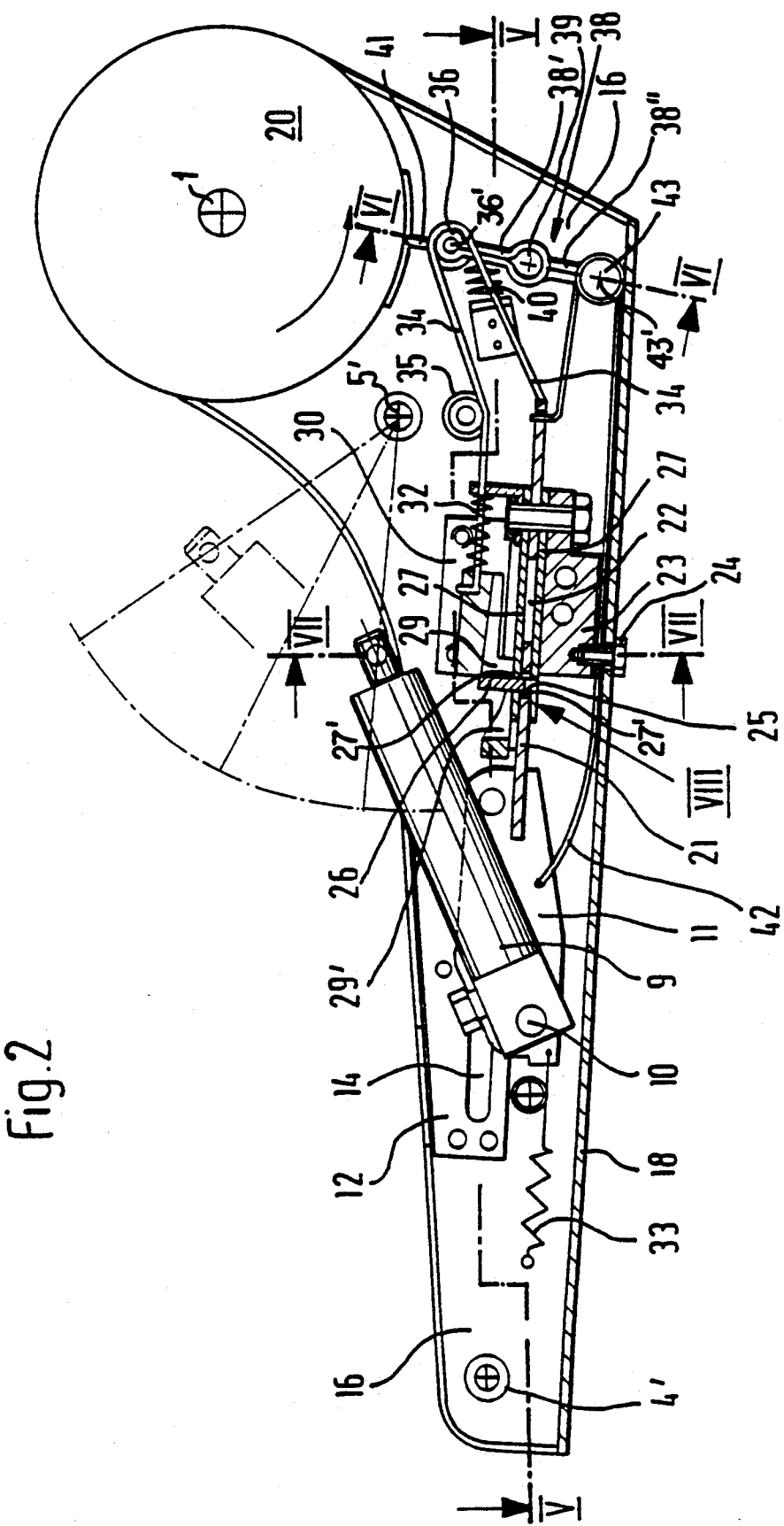
FIG. 2 is a longitudinal sectional detailed view of the first embodiment of the present invention as shown in FIG. 1.
Figure 5:
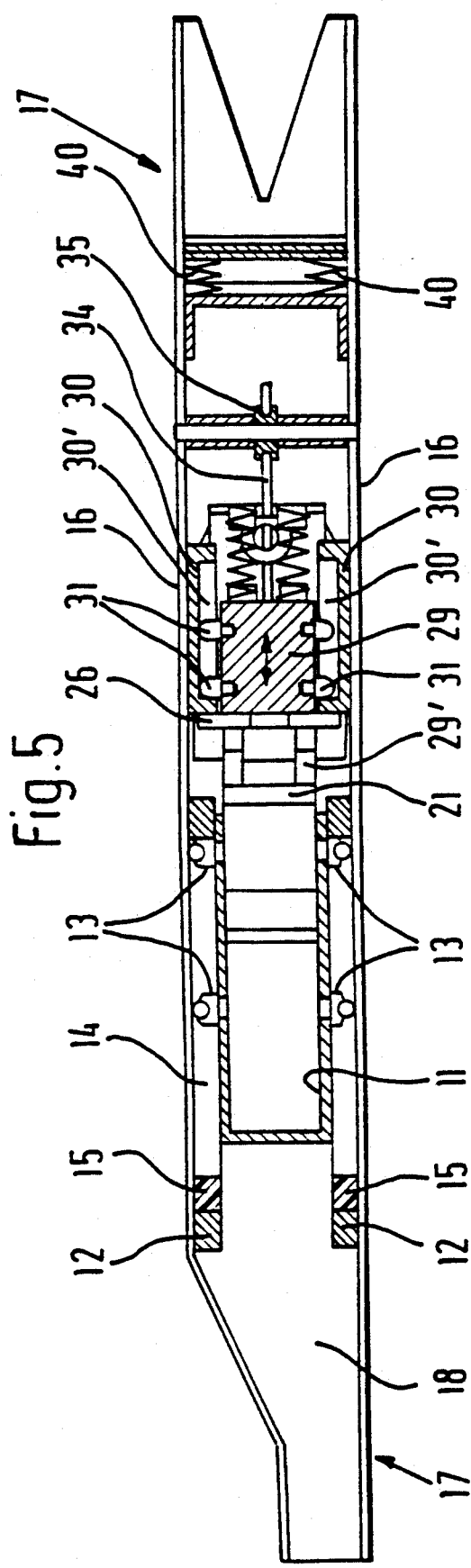
FIG. 5 is a plan view in section, taken along line V—V of FIG. 2.

In this first embodiment, the adjustment element 8 comprises a hydraulically activated working cylinder 9 (FIG. 2). Alternatively, a threaded spindle with a threaded nut, which can be rotated with respect to one another by means of a motor can also be used.

As seen in FIG. 2, the lower end of the working cylinder 9, which is inclined rearwardly and upwardly, is connected to a slider 11 in hinge-like fashion, by means of a pin 10, which extends in the transverse direction of the seat. The slider 11 is mounted and guided movably in a slide body 12 along the longitudinal direction of the seat. The slider 11 is formed of sheet metal, and has laterally protruding roll-body supports 13, each of which engages a guide groove 14, of the two jaws of the slide body 12. These jaws receive the slider 11 between them. A separate damping element 15 is inserted in the front end of each of the guide grooves 14. The two forward roll-body supports 13 contact these two damping elements 15 when the slider 11 reaches its front-most position.

The slide body 12 is inserted between the two side jaws 16 of a mounting-type side part 17 which, as FIGS. 6 and 7 show, is connected to the slide rail 19 through a floor section 18. The.,slide rail 19 is movably connected to the guide rail 19' in a positive-locking fashion along the transverse direction of the rail. The slide rail 19 can be moved in the longitudinal direction of the rail even where the guide rail 19' is rigidly connected to the vehicle floor.

The rearward end section of the side jaws 16 of the mounting-type side part 17 forms a leg which is inclined rearwardly and upwardly The lower end of the cushion support of the bracket 1 is connected to these legs by way of a hinge mounting that contains an adjustment gear. A cylindrical part, disposed concentrically with respect to the pivoting axis of the backrest 1, is rigidly connected to the cushion support of backrest 1, and is shown by reference numeral 20.

The normal position of the slider 11 is at the rear end of its adjustment range. To secure the slider 11 in this position, a locking bracket 21, which is rigidly connected to the slider 11, protrudes over the rear end of the slider. In this embodiment, locking bracket 21 lies parallel to the floor section 18, and can be introduced into a slot 22 of a holding body 23. In this embodiment, holding body 23 is formed of several parts, and is secured to the floor section 18 by screws 24.

At its end section, which can be introduced into the slot 22, the locking bracket 21 has a recess 25 for engaging a locking element 26. The recesses 25 lie opposite one another at the two longitudinal sides, and are open towards the outside. The locking element 26 consists of a U-shaped metal plate which can be moved perpendicular to the locking bracket 21 and to the plates 27 which bound the slot 22 on top and bottom. The plates 27 are rigidly connected to the remaining parts of the holding body. The two parallel, downwardly pointing legs 26' of the locking element 26, always engage a cross slot 27' of the upper plate 27, with which a cross slot 27" of the lower plate 27 is in coincidence. The legs 26' of the locking element 26 engage this cross slot 27" when the locking element 26 is in its locking position, in which a pre-tensioned spring 53 tends to keep it.

When the locking bracket 21 is in its locking, position, the recesses 25 are aligned with the two cross slots 27', 27" of the plates 27, and are penetrated by the two legs 26' of the locking element 26, as shown in FIG. 2. As also shown in FIG. 2, the recesses 25 are longer in the longitudinal direction of the locking bracket 21 than the thickness of the plate which forms the locking element 26.

Figure 8:
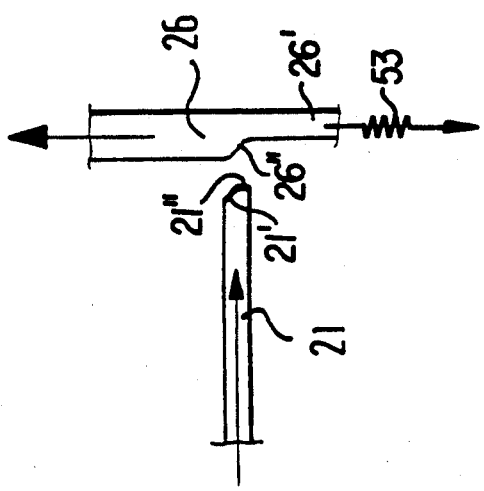
FIG. 8 is an enlarged side view of the rearwardly pointing end of the bolt of the locking device for the slider and the locking element associated with it.

Referring to FIG. 8, the free end of the locking bracket 21 has a bevel 21' on top. On that side which faces the slider 11, the lower edge of the yoke section 26' of the locking element 26 is likewise beveled, so that the locking bracket 21 can push the locking element 26 from its locking position into its release position, counter to the force of the spring which loads it. The locking element 26 spontaneously returns into its locking position as soon as the locking bracket 21 is introduced into the slot 22 far enough so that its recesses 25 are aligned with the two cross slots of the plates 27.

A slide 29 with an wedge-shaped end section 29' is provided so that the locking element can be lifted out from its locking position. The wedge-shaped end section 29' lies on top of the upper plate 27. From that side which faces the slider 11, its grips, in between the upper plate 27 and the yoke section 26" of the locking element 26, and thus lifts out the locking element 26, the more the end section 29' is moved towards the rear. With the exception of the end section 29', slide 29 is disposed between two jaws 30, each of which is equipped with a longitudinal groove 30'. The slide pegs 31 [FIG. 7] extend laterally over the slide 29 and engage with longitudinal groove 30'. The jaws 30 are rigidly connected to the side jaws 16, between which they are disposed just like the holding body 23.

As shown in FIG. 2, a pre-tensioned screw spring 32 is supported at one end at the holding body 23 on the other end at the rearwardly pointing front side of the slide 29. Spring 32 tends to hold the slide 29 in a position in which the locking element 26 is not lifted through the end section 29' of slide 29.

In operation, for the backrest 1 to pivot freely, the rear end of the cushion support 2 is lowered downwards far enough so that no significant cushion pressure occurs. Consequently, the lower end of the working cylinder 9, together with the slider 11, must be moved forwards, that is, to the left when viewing FIG. 2. But this motion is possible only if the locking element 26 first has been moved upwards into its release position, in which its legs release the locking bracket 21. To begin the free pivoting process, that is a pivoting motion of the backrest 1 towards the front, the slide 29 therefore must be moved to the rear, that is to the right when viewing FIG. 2. Only then can a pretensioned screw spring 33, which grips the front end of the slider 11, move the slider 11 forwards. Here this motion is supported by the weight of the seat part. This weight is transmitted through the working cylinder 9 to the slider 11 with a forward pointing component. The motion of the slide 29 towards the rear is effected by means of a cable 34, one of whose ends is fixedly connected to the slide 29. From here, cable 34 passes over a first deflection roll 35, which is mounted on the mounting-type part 17, and around a second deflection roll 36, where the cable 34 covers approximately over half the circumference of roll 36. From the second deflection roll 36, the cable extends to the holding body 23, where its other end is fixedly connected.

The second deflection roll 36 is rotatably mounted in a central recess 37 of the upwardly pointing arm 38' of a double-arm pivoting lever 38 with an axle 36' that runs parallel to the pivoting axle 1' of the backrest 1. The double-arm pivoting lever 38 is likewise pivotably mounted on an axle 39, which lies parallel to the pivoting axle 1' of the backrest 1, and which, as FIG. 6 shows, on its part is mounted in the two jaws 16 of the mounting-type side part 17. A pre-tensioned spring 40 presses the arm 38' towards the rear and thus keeps the cable 34 tensioned.

Figure 3:
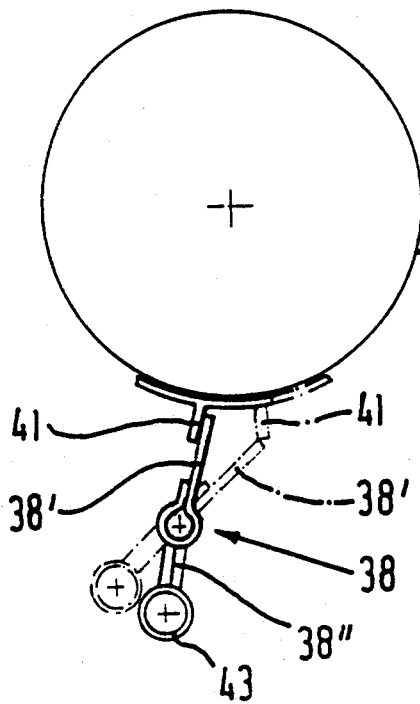
FIG. 3 is a side view which illustrates the position of the pivoting lever of the first embodiment relative to the position of the driver of the backrest, which activates the lever, when the backrest is in its pivoted position while it is freely pivoting forwards.
Figure 4:
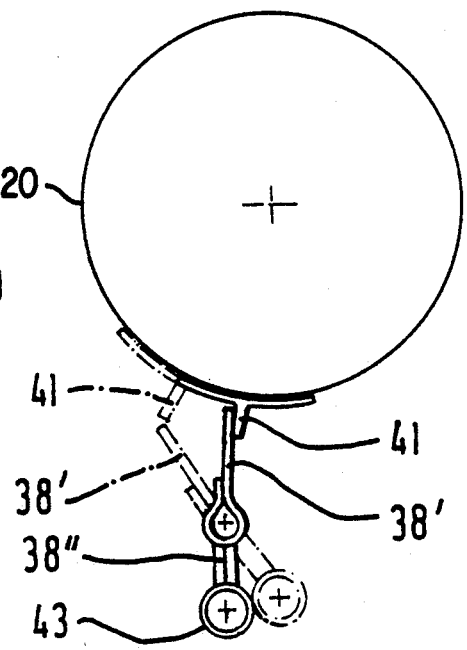
FIG. 4 is a side view which illustrates the position of the pivoting lever of the first embodiment relative to the position of the driver of the backrest, while the backrest is pivoting back during a free pivoting process.

As perhaps best seen in FIGS. 2, 3 and 4, the upper end of the arm 38', which protrudes over the second deflection roll 36, extends into the path of motion of a driver 41 which protrudes radially from the cylindrical part 20. In the normal position of the backrest 1, this driver 41 points in a direction in which its rearwardly pointing surface contacts the forwardly pointing surface of the arm 38'. If the backrest 1 makes a pivoting motion towards the front, the driver 41 therefore carries along the arm 38' towards the rear. Here, the slide 29 is moved towards the rear, and the locking element 26 is lifted out far enough so that it releases the locking bracket 21. This release position is reached even before the driver 41 has loosened from the arm 38' during the forwards pivoting motion of the backrest, and before the driver 41 therefore releases the arm 38' to return into its original position under the action of the screw spring 32 which grips the slide 29. Before the arm 38' can return to its original position, the slider 11 is moved forwards through the screw spring 33 and the weight of the seat part and the cushion pressure between the seat cushion 3 and the cushion of the backrest 1. Here, the locking bracket 21 is pulled out from the slot 22. As a consequence of this motion the slider 11 towards the front, the cushion support 2 has been lowered far enough so that n troublesome cushion pressure occurs during the further forward pivoting motion of backrest.

If the backrest 1 is again pivoted towards the rear, the slider 11 must again be brought into its rearward position, and the locking bracket 21 must again be brought into its rearward position, and the locking bracket 21 must be locked in the slot 22. Consequently, one end of a second cable 42 is fastened at the slider 11. The cable 42 is conducted through a longitudinal duct at the lower side of the holding body 23 to a third deflection roll 43, which is rotatably mounted in the downwardly pointing arm 38" of the pivoting lever 38 with an axle 43' that is parallel to the axle 39. From the third deflection roll 43, which the cable 42 surrounds along about half of its circumference, the second cable 42 runs to the holding body 23, where its other end is fastened.

When the backrest 1 executes a pivoting motion towards the rear, the driver 41 comes into contact with the rearwardly pointing surface of the upwardly pointing arm 38'. For this reason, the arm 38' is carried along towards the front and the pivoting lever 38 is pivoted counterclockwise when viewed according to FIG. 2. The slack of the second cable 42 is chosen s that the slider 11 reaches its rearmost position and the locking bracket 21 reaches its locking position when the arm 38' is pivoted forwards far enough beyond its starting position so that the arm 38' is situated shortly before its release by the driver 41. After the backrest 1 makes a slight pivoting motion towards the rear, beyond this angular position, the arm 38' is released. It then returns into the starting position shown in FIG. 2, under the force of the spring 40 which grips it. The backrest 1 is now pivoted forwards into its starting position. When the slider 11 moves towards the rear, the working cylinder 9 swings the rear rocker 5 again into its starting position, without any change in length.

When the slider 11 is moved towards the rear, there is no interference from the slide 29 remaining in its release position, as shown in FIG. 2, because the bevel 21' at the free end 21" of the locking bracket 21 is able to move the locking element 26 far enough upwards so that the locking bracket 21 can reach the locking position of FIG. 1. In this position, the locking element 26 then returns to its locking position, under the force of the spring 53 which grips it.

Figure 9:
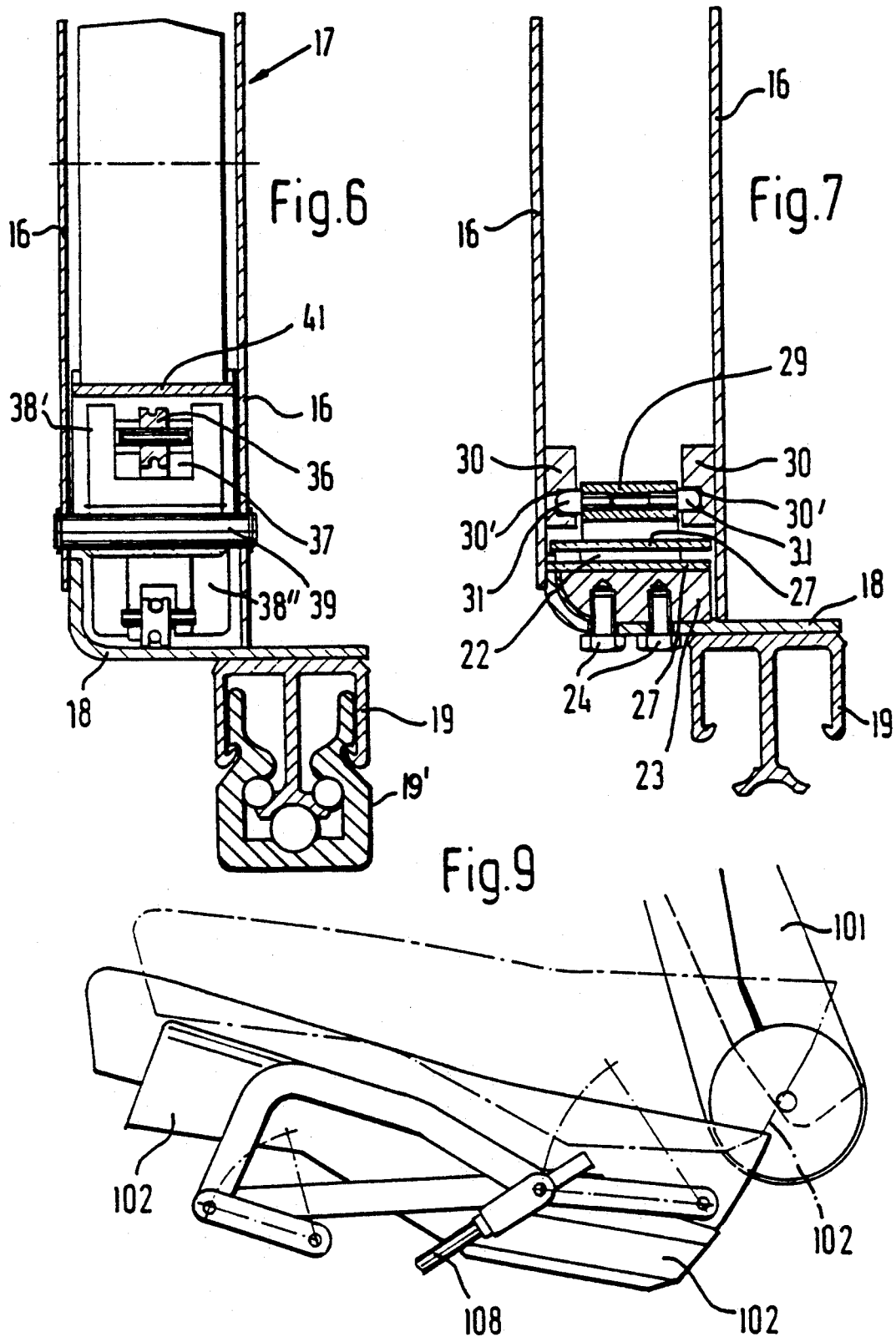
FIG. 9 is a schematic representation, in part, of a side view of a second embodiment of the present invention.

Referring now to the second embodiment of the present invention, as shown in FIG. 9, this embodiment differs from the first embodiment described in that the cushion support 102 is lowered so as to enable the backrest 101 to pivot freely, by the length of the adjustment element 108 being reduced. This adjustment element 108 has a motor-driver threaded spindle; however, as with the first embodiment, it could also be a working cylinder. The lowest position of the cushion support 102 is indicated with solid lines; the highest position is indicated with dashed lines.

Since the seat is without load when the backrest pivots freely, the adjustment speed of the adjustment element 108 can be more easily made than when height adjustment is required with a loaded seat. This greater adjustment speed has the advantage that the free pivoting motion of the backrest 101 is practically not delayed by the required lowering of the cushion support 102.

Figure 10:
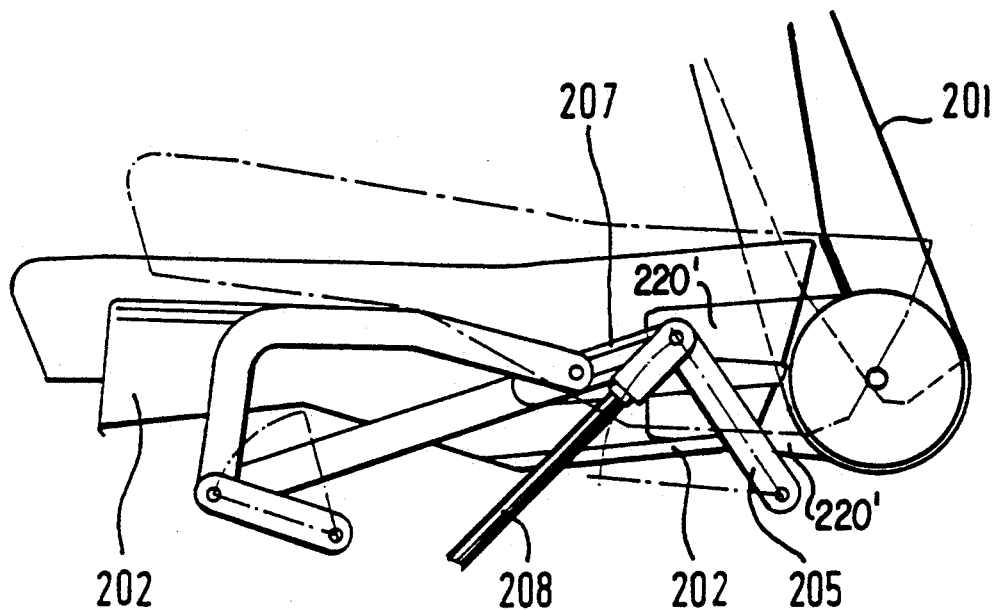
FIG. 10 is a schematic representation, in part, of a side view of a third embodiment of the present invention.

In the third embodiment of the present invention shown in FIG. 10, the cushion support 202 of the seat part is moved forward, so as to enable the backrest 201 to pivot freely, without simultaneously lowering the cushion support 202 in its rearward region. This lengthwise motion is made possible by a telescoping tension-coupler 207. This telescoping tension-coupler 207 can be lengthened to move the cushion support 202 forwards. As in the second embodiment according to FIG. 9, the pivoting drive of the rear rocker 205 is operably connected to an adjustment element 208 whose length can be changed. The adjustment element 208 can have a motor-driven threaded spindle or can be a working cylinder. The lower end of the adjustment element 208 cannot be moved along the longitudinal direction of the seat, but is pivotably connected to the mounting-type side part 220'.

Figure 11:
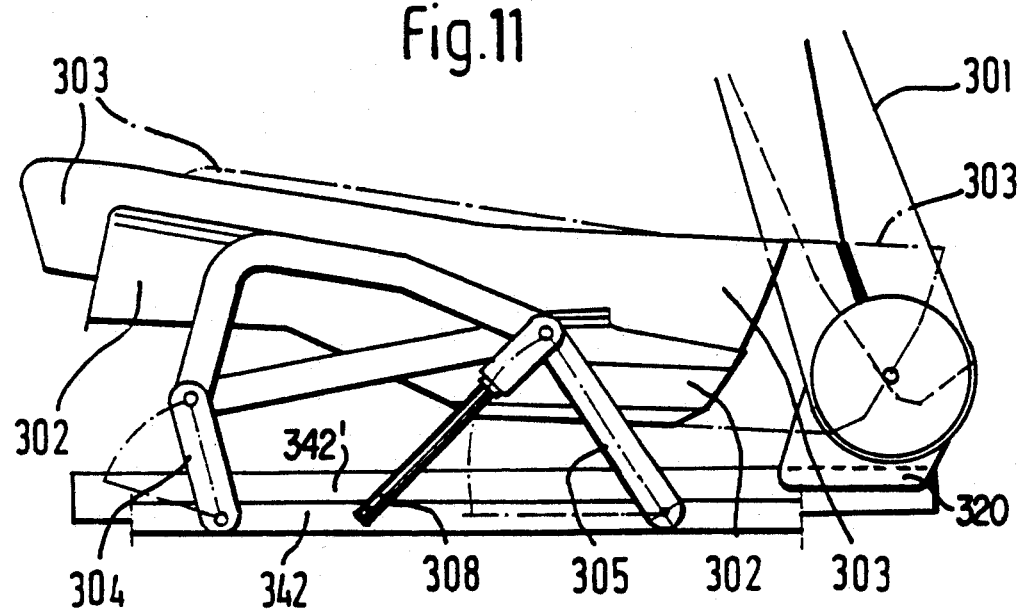
FIG. 11 is a schematic representation, in part, of a side view of a fourth embodiment of the present invention.
Figure 12:
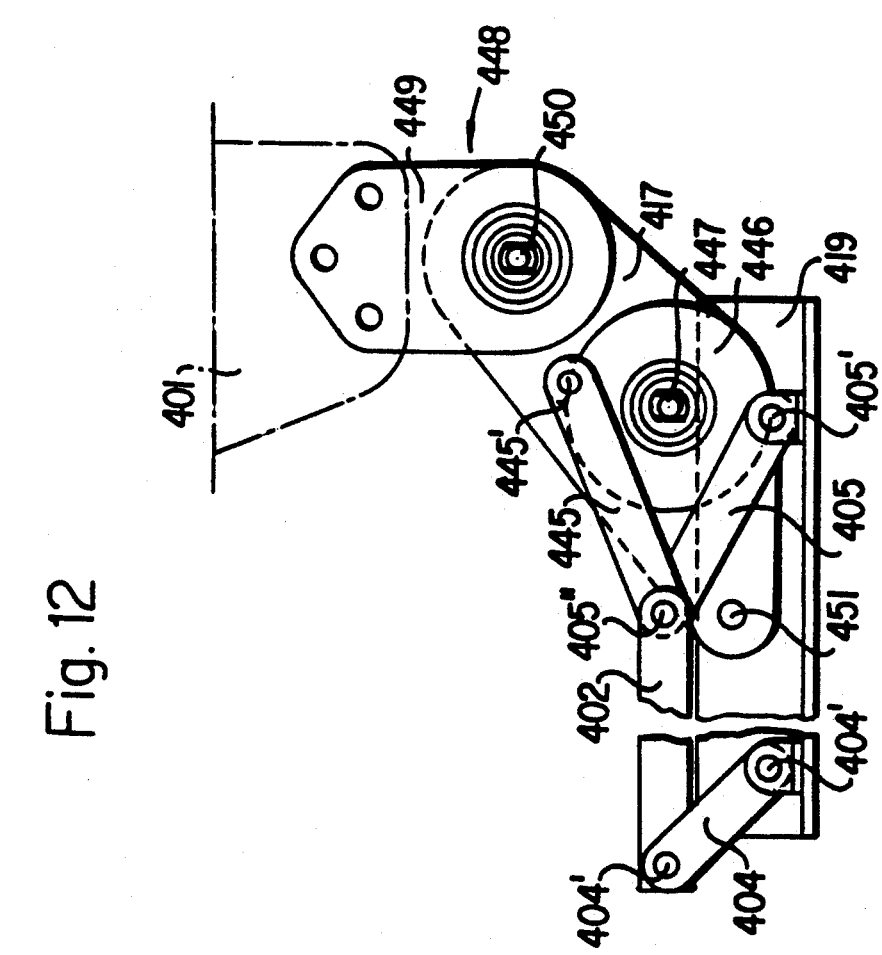
FIG. 12 is a schematic representation, in part, of a side view of a fifth embodiment of the present invention, showing the seat part in a medium height position, and the backrest in its use position.

In the fourth embodiment shown in FIG. 11, the cushion support 302 can be moved longitudinally forward so that the backrest 301 can pivot freely. The lower end of the rear rocker 305 and of the adjustment element 308 and of the forward rocker 304 is connected to the structure of the seat, so as to be movable along the longitudinal direction of the seat. For example, a rail 342 with an interlock device can be provided; however, the interlock device must be loosened to allow the rail 342 to move, for example, in a guide rail 342' that is connected to the mounting-type side part 320. The force for this motion can be transferred from the backrest to the moving parts by a pulley system.

As with the embodiments described previously, the rear rocker 305 is pivoted by means of an adjustment element 308 that is hinged to it at its upper end. In this embodiment, the adjustment element 308 includes a motor-driven threaded spindle; however, a working cylinder can also be used. As with the other embodiments described, the starting position of the seat cushion 303 is shown with dashed lines; the most forward position that can be reached by free pivoting is shown with solid lines. As seen in FIG. 11, the cushion support 302 is moved only forwards, but is not lowered, for the backrest 301 to pivot freely.

FIGS. 12 through 15 illustrate a fifth embodiment of the present invention and shows a structurally economical version of the inventive vehicle seat. Here, the rear end section of a cushion support 402 of the seat part is pivotably connected to at least one rear rocker 405, about an axle 405", which extends in the transverse direction of the seat. Its other end section is pivotably connected to the seat frame from an axle 405' parallel to the axle 405". Only a slide rail 419 of the seat frame is shown. As a rule, a separate rear rocker 405 is provided at each of the two sides of the seat.

The rear end region of the cushion support 402 is adjustable in height. The forward end region of the cushion support 402 is also supported by a forward height adjustment device. As with the embodiments previously described, this device can involve two forward rockers, 404 which are provided on the two sides of the seat, and which are connected to the cushion, support, 402 or to the seat frame, so as to be able to pivot about axles 404', 404" that run in the transverse direction of the seat.

The axle 405" connects the rear rocker 405 to the cushion support 402 and also connects one end of the lever 445. The rear rocker 405 extends from its hinge point at the seat frame at an angle, forwardly and upwardly. The other end of the lever 445 is connected to an axle 445', which likewise extends in the transverse direction of the seat. This connection is accomplished by means of a crank disk 446. The crank disk 446 is mounted at the lower mounting-type part 417 of a hinge mounting, so as to be rotatable about an axle 447 that extends in the transverse direction of the seat. The hinge mounting as a whole is designated by reference numeral 448. It will be appreciated that hinge mountings 448, crank disk 446, and lever 445 are provided on both sides of the seat.

The hinge mounting 448 is designed in a conventional manner, and connects the lower end of the backrest 401 to the seat frame. This makes it possible to set the backrest into any arbitrary inclined position within its adjustment range. For this purpose, the lower mounting-type part 417 is connected to an upper mounting-type part 449 s as to be able to pivot about a hinge axle 450 that extends perpendicular to the direction of the seat. Furthermore, the hinge mounting 448 has a gear that can be driven manually or by means of a motor, and that can pivot the upper mounting-type part 449 relative to the lower mounting-type part 417 about the hinge axle 450.

In the case of a two-door car, the backrest can be flipped forward to facilitate access to the back seats, by connecting the forward end of the lower mounting-type part 417 to the seat frame so as to be pivotable about a flipping axle 451. A conventional interlock device (not shown) prevents the lower mounting-type part 417 from being pivoted about the flipping axle 451. Only when the backrest is to be pivoted freely, that is, flipped forward, is this interlock device loosened The interlock device may be a hook which grips a peg.

The crank disk 446 is driven by a self-locking gear, where a hand wheel or an electric motor can be used as driving devices. The crank disk 446 is driven synchronously on both sides of the seat.

The length of the lever 445 and the point where it is hinged to the crank disk 446 are chosen so that the axle 445' is situated approximately over the axle 447 when the cushion support 402 is in a medium height position. On its part, the axle 447 lies above the axle 405'. As shown in FIGS. 12 through 15, the cushion support 402 can be lowered still further by means of a counterclockwise rotary motion of the crank disk 446. Using a clockwise rotation, support 402 can be raised. At the highest position of the cushion support 402, as shown in FIG. 14, the axle 445' is approximately at the height of the axle 447, but behind the latter.

Figure 13:
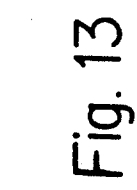
FIG. 13 is a schematic representation, in part, of a side view of the fifth embodiment after the backrest has pivoted freely and when the seat part is in a position according to FIG. 12.

If the backrest is flipped forward, where the lower mounting-type part 417 pivots counterclockwise about the flipping axle 451, as viewed in FIGS. 12 through 15, the axle 445' moves along a circular track forwards about the flipping axle 451. This causes the cushion support 402 to lower, and all the more so the higher the position of the cushion support 402 was before the backrest began to pivot freely. As shown in FIG. 13, the cushion support 402 is lowered only slightly when it was situated in a middle position or in a position lower than this. However, a greater lowering is not needed here. On the other hand, from the high position shown in FIG. 14, the cushion support 402 is lowered relatively far when the backrest executes a freely pivoting motion, as shown in FIG. 15. Consequently, irrespective of the height position of the cushion support 402, troublesome cushion pressure is avoided when the backrest executes a free pivoting motion.

With the embodiment according to FIGS. 12 through 15, it is especially advantageous that the cushion support 402 again returns automatically into the previously set height position, when the backrest swings back again into its use position. In this use position, all the parts are again situated in the position which they occupied before the backrest executed its free pivoting motion.

Although certain presently preferred embodiments of the invention have been described herein, it will be apparent to those skilled in the art to which the invention pertains that variations and modifications of the described embodiment may be made without departing from the spirit and scope of the invention. Accordingly, it is intended that the invention be limited only to the extent required by the appended claims and the applicable rules of law.

What is claimed is:

1. A vehicle seat, especially a motor vehicle seat having a freely pivotable backrest and a cushion support of a seat part, said cushion support having a rear end, the vehicle seat adapted to avoid cushion pressure between the backrest and the cushion support, comprising:
   an adjustment device for adjustably supporting said cushion support relative to the freely pivotable backrest, said adjustable support provided for adjusting height of said cushion support independent of position of the backrest, said adjustment device provided for raising said cushion support rear end for a higher seat level and for lowering said cushion support rear end for a lower seat level;
   said adjustment device including means for, in at least positions of the cushion support above its lowermost position, moving the cushion support no later than the beginning of a free pivoting motion of the backrest from its starting position toward a position selected from the group of positions consisting of a front position and a downward position at least in the region of its rear end section, and for moving said cushion support back into its starting position no earlier than while the backrest pivots back into its starting position, said moving of said cushion support into the selected position occurring as a result of height adjustment of said cushion support, and including two rockers on each side, said two rockers including a front rocker and a rear rocker, each of said rockers having a lower end area and an upper end area and being mounted in the lower end area so as to be pivotable about an axle which runs in a direction transverse to the seat, and being hinged to the cushion support in the upper end area, and being connected together by means of a coupler to form a lever gear drive having four joints.

2. The vehicle seat of claim 1, further including an adjustment element which can be changed in length, hinged to one rocker of each lever gear drive having four joints, said adjustment element pivotably connected to a structure supporting the rockers.

3. The vehicle seat of claim 2, wherein the adjustment element is hingedly connected to the rear rocker at a connection point between the rear rocket and the cushion support of the seat part.

4. The vehicle seat of claim 2, wherein said adjustment element includes a working cylinder.

5. The vehicle seat of one of claims 2, 3 and 4, further including a connection between the backrest and at least one part which is moved for the backrest to pivot freely, said connection selected from the group of connections consisting of a control connection and a gear connection.

6. The vehicle seat of claim 5, wherein the adjustment element is hinged to a slider which is movably mounted in the rocker supporting structure that supports the seat part and the backrest, said slider being movable by a first pulley at least in one direction of motion, said pulley being activated when the backrest executes a free pivoting motion.

7. The vehicle seat of claim 6, further including an interlock device for locking said slider positively in a rear position, and to be automatically loosened by the backrest when freely pivoting in a forward direction.

8. The vehicle seat of claim 6, wherein said slider is movable by said pulley from a forward position, corresponding to a lowered position of the cushion support into a rearward position, corresponding to a starting position, counter to a force of a pre-tensioned spring.

9. The vehicle seat of claim 8, further including an interlock device for locking said slider positively in a rear position, and to be automatically loosened by the backrest when freely pivoting in a forward direction.

10. The vehicle seat of claim 8, further including a second pulley which grips a slide by means for loosening the interlock device counter to the force of a reset spring, and also for gripping a pivoting lever which is mounted at the supporting structure so as to be pivotable about an axle which runs in a transverse direction of the seat, and is pivotable by means of a driver of the backrest.

11. The vehicle seat of claim 10, wherein said first pulley is adapted to grip the pivoting lever.

12. The vehicle seat of claim 11, wherein said pivoting lever is a double-arm lever having two arms, having one arm which points towards a pivoting axle provided on the backrest and extending into the pivoting path of the driver provided at the backrest within a pivoting range that is adequate for activating the second pulley by one arm and the first pulley by the other arm.

* * * * *